(12) United States Patent
Bass, Sr.

(10) Patent No.: US 6,264,335 B1
(45) Date of Patent: Jul. 24, 2001

(54) LIGHT-REFLECTIVE MARKING CLIP

(76) Inventor: James C. Bass, Sr., 211 Williams Ave., Fruitland, MD (US) 21826

( * ) Notice: Subject to any disclaimer, the term of this patent is extended or adjusted under 35 U.S.C. 154(b) by 0 days.

(21) Appl. No.: 09/344,497

(22) Filed: Jun. 25, 1999

(51) Int. Cl.⁷ .................................................. G02B 5/12
(52) U.S. Cl. ........................... 359/515; 359/543; 359/544
(58) Field of Search ..................................... 359/544, 515, 359/531, 532, 547, 548, 551, 552

(56) References Cited

U.S. PATENT DOCUMENTS 4,600,269 * 7/1986 Rass .
5,677,790 * 10/1997 Taglieri ................................. 359/515

* cited by examiner

Primary Examiner—James Phan
(74) Attorney, Agent, or Firm—Wenderoth, Lind & Ponack, L.L.P.

(57) ABSTRACT

A light-reflective path-marking clip includes a reflective element connected to a clip portion and can be attached to bushes, tree branches, or high grasses to mark a path into and out of woods or thickets to enable hunters, bird watchers, hikers, campers, and others to find their way in and out of the woods day or night.

20 Claims, 2 Drawing Sheets

LIGHT-REFLECTIVE MARKING CLIP

BACKGROUND OF THE INVENTION

When hunters, hikers, or others seek to provide landmarks in the woods, they sometimes use a conventional marker. The conventional marker is a tack that is stuck into trees. The tack has a reflective coating or tape over the head of the tack. However, the tack is difficult to locate during the daytime because the reflective tape or coating is not bright enough. Even at night, the size of the reflective portion of the tack causes the tack to be difficult to locate.

The prior art reflective tack is extremely difficult to remove from trees. Therefore, people tend to leave the tacks in the trees resulting in rusting of the tacks. Since the tacks tend to not be reusable, the reflective tacks are not cost efficient since the user of the tacks has to continually purchase new tacks.

The rusting of tacks left in trees causes the tacks to be environmentally unsafe. The tacks are also environmentally unsafe because the reflective coating of tacks left in trees eventually peels off. Further, tacks left in trees can be a hazard at saw mills.

SUMMARY OF THE INVENTION

The present invention is a light-reflective marking clip that overcomes the disadvantages of conventional path markers. The reflective clip of the present invention can be attached to various objects such as tree branches, briar bushes, weed grasses, etc., to mark a path through woods or thickets to enable hunters, bird watchers, hikers, campers, and others, to find their way in and out of the woods day or night without causing the drawbacks associated with the prior art path markers. The reflective clip of the present invention is reliable, easy to use, reusable, durable in all kinds of weather, long-lasting, environmentally safe, and economical.

The light-reflective clip of the present invention is a spring biased clip having a reflective element on one or two sides of the clip. The light-reflective clip is superior to the conventional reflective tack since it can be attached to a wider variety of objects in the woods, such as thin branches, bushes, and tall grasses, to mark a path even where no large trees are present. In contrast, the conventional tack cannot be used with thin branches, bushes or grasses.

Because of a larger and superior reflective area than that of the prior art tack, the reflective clip of the present invention is more reliable in successfully indicating the location of the path to the user. The prior art tacks have a reflective coating or tape on the head of the tack. This coating is less reflective than the reflective element of the present invention. The reflective element of the present invention is a plastic material cut and angled so as to reflect light. By its size and configuration, the reflective element of the present invention reflects more light than the reflecting coating or tape of the prior art tacks. In the daytime, the large plastic reflective area of the present clip serves to reflect more natural light, allowing the clip to be seen from a further distance. At night, the large plastic reflective area is easily detected when using a flashlight or lantern. Also, the large plastic reflective element is more easily seen in poor weather, such as rain, snow, and fog.

The light reflective clip of the present invention is easy and quick to mount and retrieve. The clips are simply clipped onto any piece of a tree, bush, or tall grass along the path. In contrast, the prior art tack must either be forcibly pushed into a tree or driven in with a hammer. Removal of the clip is just as easy and quick as the mounting. The user simply picks the clips off the trees, bushes, or grass while proceeding along the path. The prior art tack is either not removed at all, causing environmental and other hazards, or is pried from the tree. The removal of the tacks is difficult and much more time consuming than the simple removal associated with the light-reflective clip of the present invention, thereby causing the user to be delayed in traveling along the path.

Since the light-reflective clip of the present invention is so easily and quickly removable, the clip can be reused. When setting out to mark a path, the user simply brings one or more of the clips and marks the path at strategic locations. When returning along the path, the user simply removes the clips and keeps them for use at another time. In this way, the same clip or clips can be used over again for subsequent trips. In contrast, the prior art tack is not reusable as a practical matter. Since the tacks are so difficult to remove, users tend not to remove them. Therefore, the tacks are never reused. Also, even if a user does remove the tack, the tack is often damaged such that it cannot be used again.

Since the reflective clip of the present invention is easily removed and reusable, users of the clip will tend to remove the clips for reuse rather than leaving them in the woods as with the prior art tack. Therefore, the reflective clip of the present invention is safer to the environment than the prior art tack.

DETAILED DESCRIPTION OF THE PREFERRED EMBODIMENTS

Figure 1:
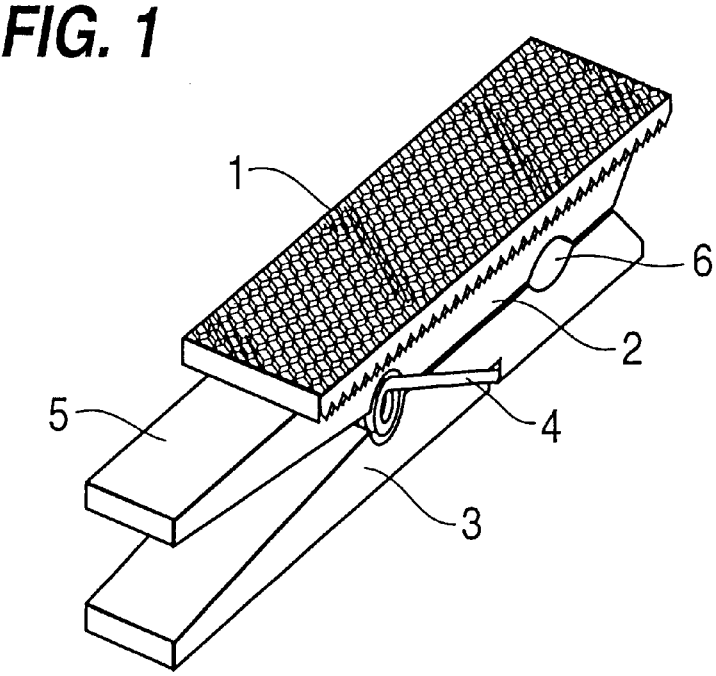
FIG. 1 is a perspective view showing a first embodiment of the light-reflective clip of the present invention.

FIG. 1 illustrates a first embodiment of the light-reflective clip of the present invention. The light-reflective clip includes a light reflective element 1 mounted on a first clip portion 2. A second clip portion 3 is held to the first clip portion by a metal or plastic spring 4 which biases the first and second clip portion in a closed position. A recess 6 is formed in the first and second clip portions 2 and 3 near a front end of the light reflective clip. The recess is formed by a recessed portion in the first clip portion 2 and a corresponding recessed portion in the second clip portion 3. The recess enhances the ability of the clip to be fastened onto branches, bushes, and grasses. A grip 5 on a back portion of the clip allows the user to easily grip the light-reflective clip to apply pressure to open the front end of the clip.

Figure 3:
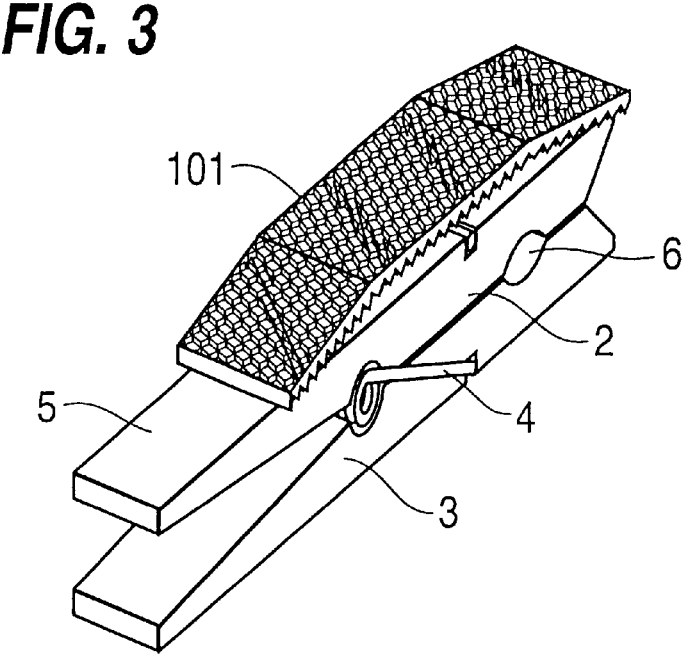
FIG. 3 is a perspective view showing a second embodiment of the light-reflective clip of the present invention.

The light-reflective element 1 is a plastic reflector having three-dimensional shapes, such as cubes, pyramids, tetrahedrons, etc., formed, or cut, into the plastic material. The three-dimensional plastic shapes have light-reflective planar surfaces oriented at different angles causing the reflective element 1 to reflect light in a wide angular range with respect to the clip. This allows the clip to be seen more readily if the clip is mounted in a tilted manner. The structure of the reflective element also increases the visibility of the clip along a winding path, or a path that varies in escalation. The wide angular range of reflection also increases the visibility of the reflective clip if viewed from a vantage point well off the marked path. Further, as illustrated in FIG. 3, a light reflective element 101, having multiple planar portions angularly offset with respect to each other, can be provided so as to further increase the angular range at which the reflector will reflect light. This increased angular range allows the light-reflective clip to be viewed from an even wider angular range with respect to the clip. Each of the angled planar portions of the reflective element 101 can include the three-dimensional reflective shapes as in the reflective element 1 of FIG. 1.

The clip portions 1 and 2 are preferably made of wood or plastic. The inner abutting surfaces of the clip portions 1 and 2 provide gripping via the biasing tension of the spring 4 and frictional forces between the clip portions 1 and 2 and the object to which the clip is fastened, such as a tree branch. To further assist the gripping, the recess 6 is provided. A wider or narrower recess 6 can be provided to make the clip suitable for gripping objects of differing sizes. Further, multiple recesses of the same or differing sizes can be provided.

While the two preferred embodiments of the reflective element have been illustrated, the shape and size of the reflective element can be changed to further increase the reflective area of the clip. For example, the reflective element can be substantially wider than the clip portions 2 and 3 and can be formed in various geometrical shapes. The reflective element can have additional angularly offset planar portions in various directions so as to further expand the angular viewing range and direction. For example, a reflective element can be formed so as to include the three planar portions of the reflective element 101 of FIG. 3 as well as two additional angularly offset planar portions on opposing sides of the three planar portions of the reflective element 101. The reflection characteristics of the clip can also be increased by forming the clip portions 2 and 3 from reflective plastic such as that used to form the reflective element 1. Further, the reflective element 1 and the clip portion 2 can be integral.

Figure 2:
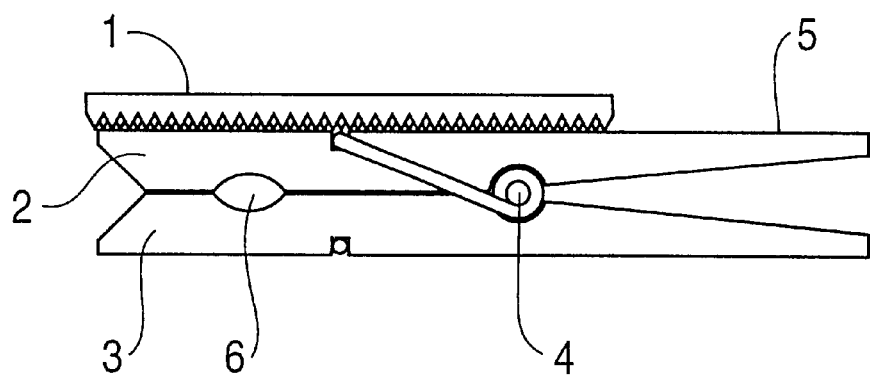
FIG. 2 is a side view of the light-reflective clip illustrated in FIG. 1.
Figure 4:
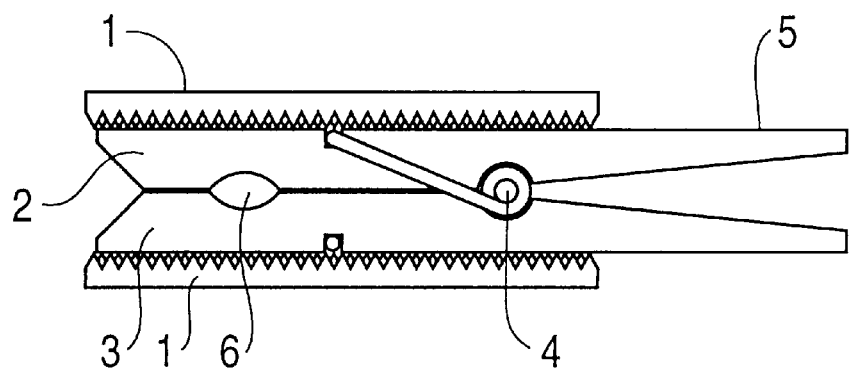
FIG. 4 is a side view of the light-reflective clip having a second light reflective element.

The embodiments illustrated in FIGS. 1–3 include a single reflective element on one of the clip portions. However, a reflective element 1 or 101 can be included on each of the clip portions 2 and 3, thereby allowing the reflective clip to reflect from both sides. FIG. 4 illustrates a clip having a reflective element on each of the clip portions. By adding angularly offset planar portions to the reflective elements as described above, the reflective clip can be made to reflect in all directions. Further, the reflective element or elements can be dimensioned so as to span the entire clip portion to which the reflective element is attached or formed such that the grip 5 is covered by the reflective element. Also, reflective elements of different colors, or capable of reflecting light in different colors, can be provided on the clip portions 2 and 3, respectively, so as to provide an indication of the direction at which the reflective clip is being viewed. For example, the reflective clips can be placed along a path in an orientation such that reflective elements of one color indicate the path into the woods and reflective elements of another color indicate the path out of the woods.

Although the present invention has been fully described in connection with preferred embodiments thereof with reference to the accompanying drawings, it is noted that various changes and modifications will be apparent to those skilled in the skilled in the art. Such changes and modifications are to be understood as included within the scope of the present invention as defined by the appended claims.

What is claimed is:

1. A light-reflective path-marking clip to be attached to objects along a path so as to mark the path, said light-reflective path marking clip comprising:

a first clip portion having a front end and a back end;

a second clip portion having a front end and a back end;

a spring connecting said first and second clip portions so as to bias said front ends of said first and second clip portions together and such that a squeezing pressure applied to said back ends of said first and second clip portions tends to separate said front end of said first clip portion from said front end of said second clip portion;

a light-reflective element, connected to said first clip portion so as to be immovably fastened to said first clip portion and so as to span from said front end of said first clip portion toward said back end of said first clip portion, said light-reflective element being capable of reflecting light incident on said light-reflective element.

2. A light-reflective path-marking clip as claimed in claim 1, further comprising:

a recess formed between said first and second clip portions near said front ends of said first and second clip portions, including a first recess portion in said first clip portion and a second recess portion in said second clip portion.

3. A light-reflective path-marking clip as claimed in claim 1, wherein said light-reflective element comprises a plurality of planar portions angularly offset with respect to each other.

4. A light-reflective path-marking clip as claimed in claim 3, wherein each of said planar portions of said light-reflective element include a plurality of geometric shapes formed therein and each geometric shape has a plurality of light-reflective planar surfaces each oriented at a different angle.

5. A light-reflective path-marking clip as claimed in claim 3, wherein said light-reflective element is integrally formed with said first clip portion.

6. A light-reflective path-marking clip as claimed in claim 1, wherein said light-reflective element includes a plurality of geometric shapes formed therein and each geometric shape has a plurality of light-reflective planar surfaces each oriented at a different angle.

7. A light-reflective path-marking clip as claimed in claim 1, wherein said first and second clip portions are wood.

8. A light-reflective path-marking clip as claimed in claim 1, wherein said light-reflective element is plastic.

9. A light-reflective path-marking clip as claimed in claim 1, wherein said spring is metal.

10. A light-reflective path-marking clip as claimed in claim 1, wherein said spring is plastic.

11. A light-reflective path-marking clip as claimed in claim 1, wherein said first and second clip portions are plastic.

12. A light-reflective path-marking clip as claimed in claim 1, wherein said light-reflective element is integrally formed with said first clip portion.

13. A light-reflective path-marking clip as claimed in claim 1, further comprising a further light-reflective element, connected to said second clip portion, capable of reflecting light incident on said further light-reflective element.

14. A light-reflective path-marking clip as claimed in claim 13, wherein said further light-reflective element comprises a plurality of planar portions angularly offset with respect to each other.

15. A light-reflective path-marking clip as claimed in claim 14, wherein each of said planar portions of said further light-reflective element include a plurality of geometric shapes formed therein and each geometric shape has a plurality of light-reflective planar surfaces each oriented at a different angle.

16. A light-reflective path-marking clip as claimed in claim 13, wherein said further light-reflective element includes a plurality of geometric shapes formed therein and each geometric shape has a plurality of light-reflective planar surfaces each oriented at a different angle.

17. A light-reflective path-marking clip as claimed in claim 13, wherein said further light-reflective element is integrally formed with said second clip portion.

18. A light-reflective path-marking clip as claimed in claim 1, wherein said light-reflective element spans the entire first clip portion from said front end of said first clip portion to said back end of said first clip portion.

19. A light-reflective path-marking apparatus to be attached to objects along a path, said apparatus comprising:

reflector means for reflecting light incident on said reflector means;

means for attaching said light-reflective path-marking apparatus to objects along the path so as to mark the path; and means for detaching said light-reflective path-marking apparatus from the objects along the path so as to unmark the path.

20. A light-reflective path-marking apparatus as claimed in claim 19, wherein said reflector means includes means for indicating a first direction of reflection with respect to said apparatus and means for indicating a second direction of reflection with respect to said apparatus.

\* \* \* \* \*